United States Patent Office 3,266,243
Patented August 16, 1966

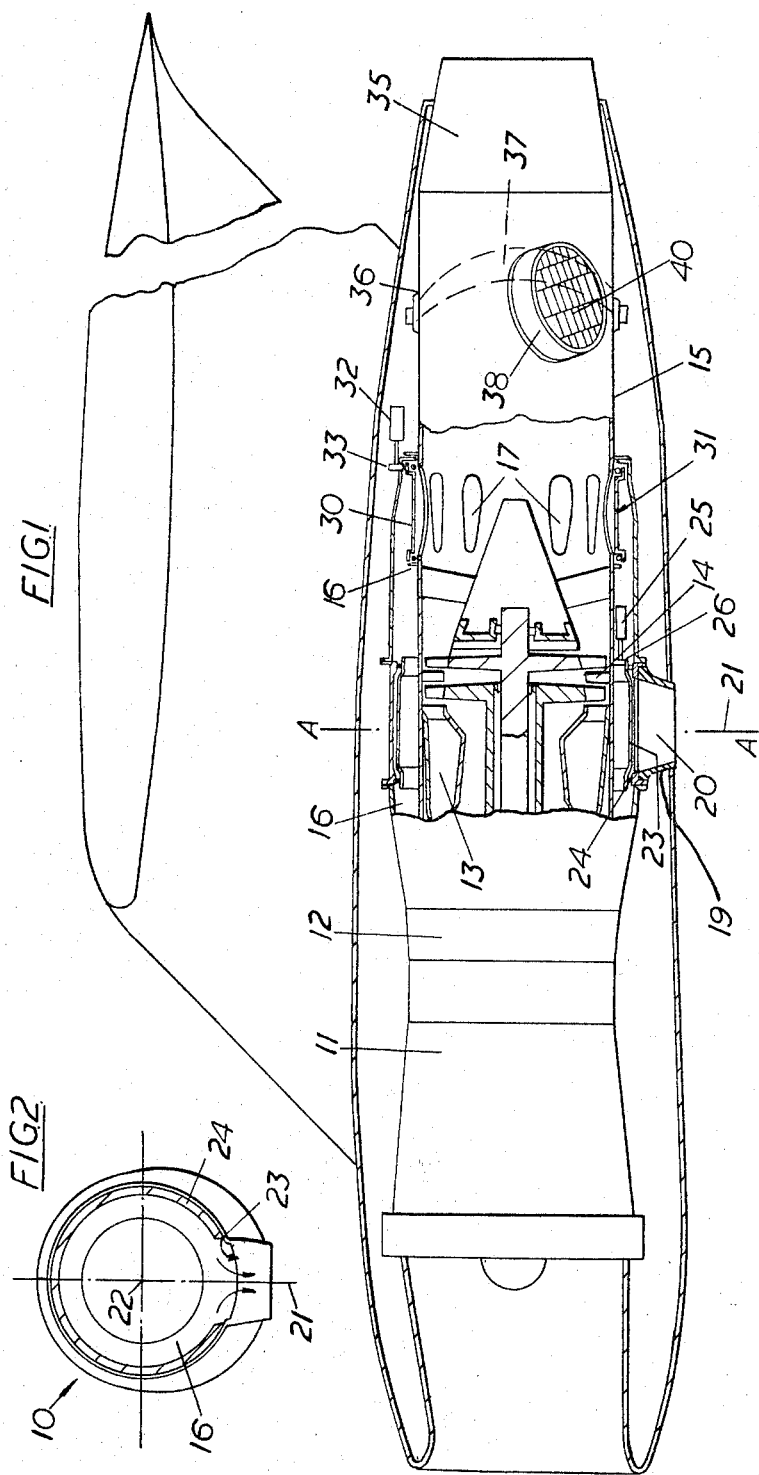

3,266,243
GAS TURBINE JET PROPULSION ENGINE
Samuel David Thomas, Allestree, Derby, England, assignor to Rolls-Royce Limited, Derby, England, a company of Great Britain
Filed June 23, 1964, Ser. No. 377,184
Claims priority, application Great Britain, July 15, 1963, 28,016/63
6 Claims. (Cl. 60—35.54)

This invention concerns gas turbine jet propulsion engines and aircraft provided therewith. The invention, although not so limited, will hereinafter be described with reference to its use on gas turbine jet propulsion by-pass engines.

According to the present invention there is provided a gas turbine jet propulsion engine comprising compressor means, combustion equipment, turbine means, a jet pipe and a jet nozzle all arranged in flow series along a horizontal longitudinal axis, an axially extending passage arranged to receive some of the air compressed by the compressor means, a stub pipe communicating with and extending radially from said passage, a fixed propulsion nozzle at the radially outer end of said stub pipe and arranged such that, in normal use, it may direct the compressor air from said passage substantially vertically downwardly to provide direct lift, a valve device adapted to permit and prevent flow of air through said propulsion nozzle, at least one exhaust nozzle having its axis inclined to the said horizontal longitudinal axis of the engine and communicating with said jet pipe, and deflector means disposed within said jet pipe and movable between two positions, in the first of which it permits exhaust gas flow through said jet pipe and prevents exhaust gas flow through each exhaust nozzle and in the second of which it prevents exhaust gas flow through the jet pipe and permits exhaust gas flow through each exhaust nozzle.

Preferably there are two exhaust nozzles, disposed on opposite sides of the longitudinal axis of the engine.

In a preferred embodiment, the deflector means operates in synchronism with said valve device and/or said further valve means such that when by-pass air is being directed through said propulsion nozzle, and no by-pass air is flowing into the jet pipe, the deflector means directs the exhaust gases through said exhaust nozzle or nozzles, and, when by-pass air is prevented from flowing through said propulsion nozzle and is flowing into the jet pipe, the exhaust gases, mixed with by-pass air, pass through the jet nozzle.

Each exhaust nozzle is preferably provided with a cascade of vanes mounted for rotation about the axis of the exhaust nozzle such that the direction of the thrust produced by the exhaust gases flowing therethrough may be varied.

Preferably the by-pass air passing through said by-pass passage is directed into the jet pipe through a plurality of chutes equi-spaced in an annular formation, said further valve means being constituted by a cylindrical sleeve rotatably mounted about said chutes and adapted to cover and uncover said chutes and thus respectively prevent and permit flow of by-pass air through said chutes.

The valve device may also be constituted by a cylindrical sleeve rotatably mounted about the longitudinal axis of said engine, and adapted to cover and uncover said propulsion nozzle so as respectively to prevent and permit flow of by-pass air through said propulsion nozzle.

The cylindrical sleeves are preferably driven by air motors.

The invention also includes an aircraft provided with a gas turbine jet propulsion engine as set forth above.

The invention is illustrated, merely by way of example, in the accompanying drawings, in which:

FIGURE 1 is a diagrammatic elevation of a gas turbine jet propulsion by-pass engine according to the present invention, and FIGURE 2 is a part sectional of the engine shown in FIGURE 1 taken on line A—A of that figure.

Referring to the drawings, a gas turbine jet propulsion by-pass engine 10 is shown slung beneath the wing of an aircraft. The engine 10 comprises a low pressure compressor 11, high pressure compressor 12, combustion equipment 13, turbine equipment 14 and a jet pipe 15, all arranged in flow series along a horizontal longitudinal axis. Part of the air compressed by the low pressure compressor 11 flows through high pressure compressor 12, combustion equipment 13, turbine equipment 14 and the jet pipe 15. The remainder of the air compressed by low pressure compressor 11 passes into an axially extending by-pass passage 16 which communicates via a plurality of mixer chutes 17 with the jet pipe 15. Thus air flowing through by-pass passage 16 by-passes the combustion equipment 13 and turbine equipment 14 of the engine.

Although not shown, the turbine equipment 14 comprises, in well known manner, a high pressure and a low pressure turbine, connected, by concentric shafts, to the high pressure and low pressure compressors respectively.

A stub pipe 19 communicates with and extends radially from the by-pass passage 16, a propulsion nozzle 20 being disposed at the radially outer end of the stub pipe 19 and thus at the lowermost part of the engine 10, as seen in FIGURES 1 and 2. The propulsion nozzle 20 thus has its axis 21 normal to the longitudinal axis 22 of the engine 10. The stub pipe 19, and thus the propulsion nozzle 20, communicates with by-pass passage 16 through an aperture 23 in a cylindrical sleeve 24. The cylindrical sleeve 24 is rotatably mounted about the longitudinal axis 22 of engine 10 and is driven by an air motor 25 through gearing 26. When in the position shown in the figures, by-pass air may pass through aperture 23 and thus through propulsion nozzle 20. When the cylindrical sleeve 24 is rotated through say 90°, then aperture 23 will no longer communicate with propulsion nozzle 20, and thus by-pass air will be prevented from passing through propulsion nozzle 20.

By-pass air may enter jet pipe 15 through the mixer chutes 17. These mixer chutes are spaced and are disposed in an annular formation in the jet pipe wall, and provide additional circumferential mixing length for the by-pass air and turbine exhaust gases.

Rotatably mounted about the plurality of mixer chutes 17 is a cylindrical sleeve 30. The cylindrical sleeve 30 is provided with a plurality of equi-spaced apertures 31 equal in number and identical in shape to the inlets to mixer chutes 17. The cylindrical sleeve 30 is rotatable between two positions in the first of which its apertures 31 are aligned with the inlets to mixer chutes 17, and thus by-pass air may enter jet pipe 15 from by-pass passage 16, and in the second of which none of the apertures 31 are aligned with mixer chutes 17, and the cylindrical sleeve 30 blocks off the inlets to the mixer chutes, thus preventing by-pass air passing therethrough.

The cylindrical sleeve 30 is rotated by an air motor 32 through gearing 33.

Exhaust gases within jet pipe 15 normally pass to atmosphere through a jet nozzle 35, coaxial with longitudinal axis 22 of engine 10. However, pivotally mounted within jet pipe 15 about pivots 36 are a pair of deflecting plates 37 which may be positioned, as shown in dotted lines in FIGURE 1, such that they block off jet nozzle 35. In this position, the deflecting plates 37 deflect the exhaust gases through two exhaust nozzles 38 (only one of which is shown in FIGURE 1) disposed one either side of the longitudinal axis 22 of engine 10.

The axis of each exhaust nozzle 38 is inclined to the longitudinal axis 22 of engine 10. Rotatably mounted on the downstream end of each exhaust nozzle 38, is a cascade of vanes 40. Rotation of the cascade of vanes about the axis of the exhaust nozzle varies the direction of the thrust provided by the exhausting gases.

One arrangement and particular construction of the deflecting plates 37, exhaust nozzles 38 and cascade of vanes 40 is described in detail in U.S. Patent No. 3,130,543.

With the engine 10 mounted in an aircraft with its longitudinal axis 22 substantially horizontal, the exhaust gases passing through exhaust nozzles 38 and by-pass air passing through propulsion nozzle 20 will be directed substantially vertically downwards.

Thus for vertical take off and landing, vertical direct lift can be provided by exhaust nozzles 38 and propulsion nozzle 20 by suitable movement of the deflector plates 37 and cylindrical sleeves 24 and 30. Thus, for vertical take off and landing, all by-pass air is directed through propulsion nozzle 20, none passing to the jet pipe 15, and all the turbine exhaust gases pass through the exhaust nozzles 38, none passing through jet nozzle 35.

For normal horizontal flight, the cylindrical sleeves 24 and 30 are rotated to prevent any by-pass air passing through propulsion nozzle 20, and to direct all the by-pass air through mixer chutes 17 into the jet pipe. Deflector plates 37 are also rotated into a position in which they unblock the jet nozzle 35 and block the exhaust nozzles 38. Thus all the turbine exhaust gases, together with all the by-pass air, pass through the jet nozzle 35.

Movements of the cylindrical sleeves 24 and 30 and of deflector plates 37 are synchronized. Thus the control of these movements is so arranged that the transition of each of these members from one position to the other i.e. to control flow through propulsion nozzle 20, mixer chutes 17 and exhaust nozzles 38 is simultaneous.

It will be appreciated that there could be more than one propulsion nozzle 20. Thus there could be two, equi-spaced on either side of the longitudinal axis 22 of the engine 10, i.e. in a manner similar to that in which exhaust nozzles 38 are positioned. Also, there need only be a single exhaust nozzle 38, positioned centrally of the engine, as seen in FIGURE 2, i.e. in a manner similar to that in which propulsion nozzle 20 is positioned. In this case, of course, rotatable cascade of vanes would probably not be used.

I claim:
1. A gas turbine jet propulsion engine comprising compressor means, combustion equipment, turbine means, a jet pipe and a jet nozzle all arranged in flow series along a horizontal longitudinal axis, an axially extending passage arranged to receive some of the air compressed by the compressor means, a stub pipe communicating with and extending radially from said passage, a fixed propulsion nozzle at the radially outer end of said stub pipe and arranged such that, in normal use, it may direct the compressor air from said passage substantially vertically downwardly to provide direct lift, a valve device adapted to permit and prevent flow of air through said propulsion nozzle, at least one exhaust nozzle having its axis inclined to the said horizontal longitudinal axis of the engine and communicating with said jet pipe, and deflector means disposed within said jet pipe and movable between two positions, in the first of which it permits exhaust gas flow through said jet pipe and prevents exhaust gas flow through each exhaust nozzle and in the second of which it prevents exhaust gas flow through the jet pipe and permits exhaust gas flow through each exhaust nozzle.

2. A gas turbine jet propulsion engine as claimed in claim 1 in which there are two exhaust nozzles, disposed on opposite sides of the longitudinal axis of the engine.

3. A gas turbine jet propulsion engine comprising compressor means, combustion equipment, turbine means, a jet pipe and a jet nozzle all arranged in flow series along a horizontal longitudinal axis, an axially extending by-pass passage arranged to receive some of the air compressed by the compressor means and direct it to the jet pipe thus by-passing the combustion equipment and turbine means, a stub pipe communicating with and extending radially from said passage, a fixed propulsion nozzle at the radially outer end of said stub pipe and arranged such that, in normal use, it may direct the compressor air from said passage substantially vertically downwardly to provide direct lift, a valve device adapted to permit and prevent flow of air through said propulsion nozzle, further valve means for respectively permitting and preventing flow of by-pass air into said jet pipe when said valve device respectively prevents and permits flow of by-pass air through said propulsion nozzle, at least one exhaust nozzle having its axis inclined to the said horizontal longitudinal axis of the engine, and communicating with said jet pipe, and deflector means disposed within said jet pipe and movable between two positions, in the first of which it permits exhaust gas flow through said jet pipe and prevents exhaust gas flow through each exhaust nozzle and in the second of which it prevents exhaust gas flow through the jet pipe and permits exhaust gas flow through each exhaust nozzle, the deflector means operating in synchronism with said valve device and said further valve means such that when by-pass air is being directed through said propulsion nozzle, and no by-pass air is flowing into the jet pipe, the deflector means directs the exhaust gases through each exhaust nozzle, and, when by-pass air is prevented from flowing through said propulsion nozzle and is flowing into the jet pipe, the exhaust gases, mixed with by-pass air, pass through the jet nozzle.

4. A gas turbine jet propulsion engine comprising compressor means, combustion equipment, turbine means, a jet pipe and a jet nozzle all arranged in flow series along a horizontal longitudinal axis, an axially extending passage arranged to receive some of the air compressed by the compressor means, a stub pipe communicating with and extending radially from said passage, a fixed propulsion nozzle at the radially outer end of said stub pipe and arranged such that, in normal use, it may direct the compressor air from said passage substantially vertically downwardly to provide direct lift, a valve device adapted to permit and prevent flow of air through said propulsion nozzle, at least one exhaust nozzle having its axis inclined to the said horizontal longitudinal axis of the engine, and communicating with said jet pipe, a cascade of vanes mounted for rotation about the axis of each exhaust nozzle such that the direction of the thrust produced by the exhaust gases flowing therethrough may be varied, and deflector means disposed within said jet pipe and movable between two positions, in the first of which it permits exhaust gas flow through said jet pipe and prevents exhaust gas flow through each exhaust nozzle and in the second of which it prevents exhaust gas flow through the jet pipe and permits exhaust gas flow through each exhaust nozzle.

5. A gas turbine jet propulsion engine comprising compressor means, combustion equipment, turbine means, a jet pipe and a jet nozzle all arranged in flow series along a horizontal longitudinal axis, an axially extending by-pass passage arranged to receive some of the air compressed by the compressor means and direct it to the jet pipe thus by-passing the combustion equipment and turbine means, a stub pipe communicating with and extending radially from said passage, a fixed propulsion nozzle at the radially outer end of said stub pipe and arranged such that, in normal use, it may direct the compressor air from said passage substantially vertically downwardly to provide direct lift, a valve device adapted to permit and prevent flow of air through said propulsion nozzle, a plurality of chutes equi-spaced in an annular formation and through which by-pass air from said by-pass passage is directed into the jet pipe, a further valve means comprising a cylindrical sleeve rotatably mounted about said chutes and adapted to cover and uncover said chutes and thus respectively prevent and permit flow of by-pass air through said chutes to said jet pipe when said valve device respectively permits and prevents flow of by-pass air through said propulsion nozzle, one exhaust nozzle having its axis inclined to the said horizontal longitudinal axis of the engine, and communicating with said jet pipe, and deflector means disposed within said jet pipe and movable between two positions, in the first of which it permits exhaust gas flow through said jet pipe and prevents exhaust gas flow through each exhaust nozzle and in the second of which it prevents exhaust gas flow through each exhaust nozzle, the deflector means operating in synchronism with said valve device and said further valve means such that when by-pass air is being directed through said propulsion nozzle, and no by-pass air is flowing into the jet pipe, the deflector means directs the exhaust gases through each exhaust nozzle, and, when by-pass air is prevented from flowing through said propulsion nozzle and is flowing into the jet pipe, the exhaust gases, mixed with by-pass air, pass through the jet nozzle.

6. A gas turbine jet propulsion engine as claimed in claim 5 comprising a cylindrical sleeve rotatably mounted about the said horizontal longitudinal axis of said engine, and adapted to cover and uncover said propulsion nozzle so as respectively to prevent and permit flow of air through said propulsion nozzle.

References Cited by the Examiner

UNITED STATES PATENTS

| 3,019,600 | 2/1962 | Peek | 60—35.54 |
| 3,115,748 | 12/1963 | Wilde et al. | |
| 3,130,543 | 4/1964 | Oldfield et al. | 60—35.54 |

FOREIGN PATENTS

| 881,967 | 11/1961 | Great Britain. |
| 908,307 | 10/1962 | Great Britain. |

MARK NEWMAN, *Primary Examiner.*

A. L. SMITH, *Assistant Examiner.*